June 8, 1948. V. MOORE 2,442,875
TRUE MOTION CONNECTING ROD
Filed May 19, 1945 3 Sheets-Sheet 1
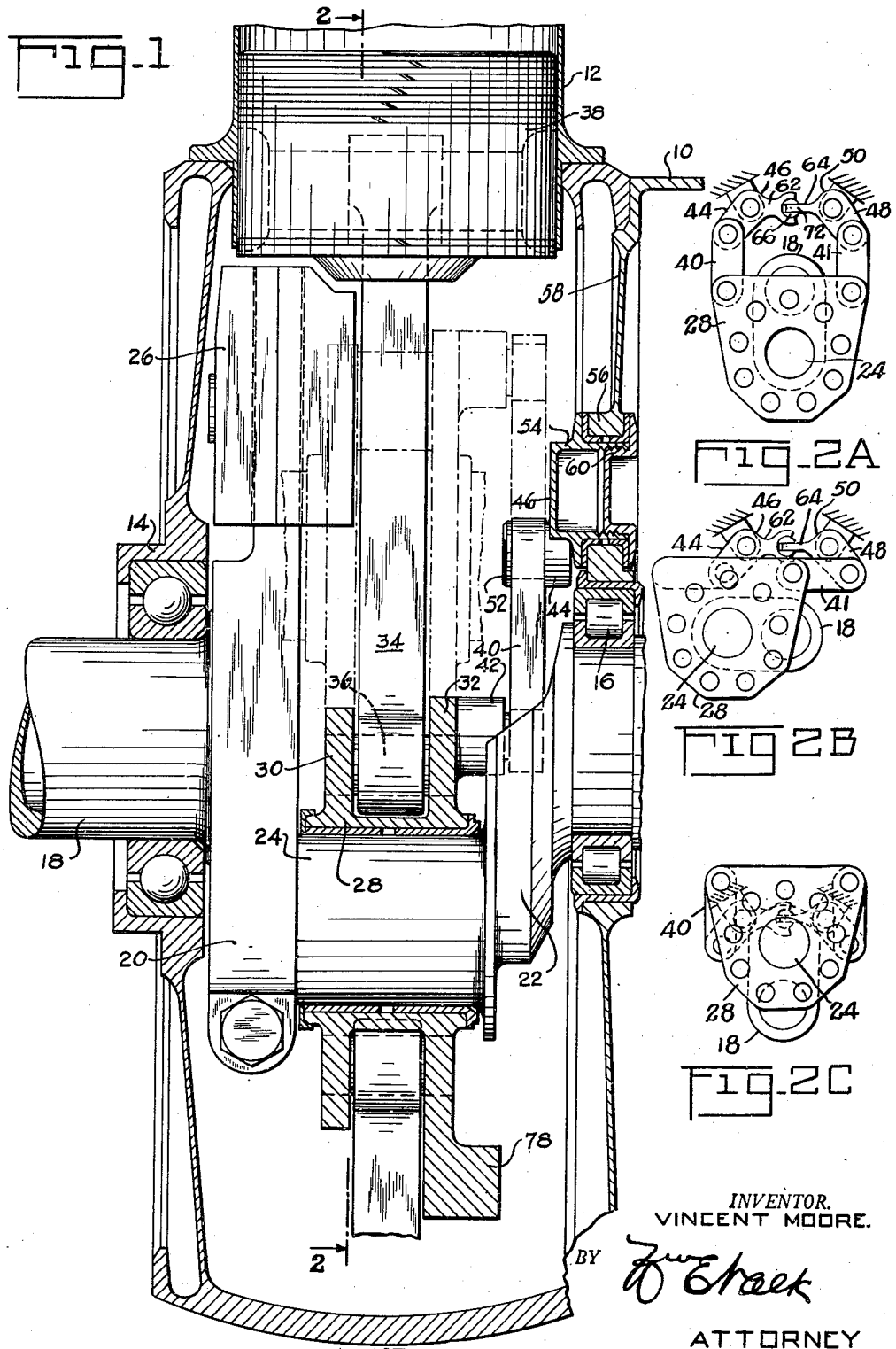
INVENTOR.
VINCENT MOORE.
BY
ATTORNEY

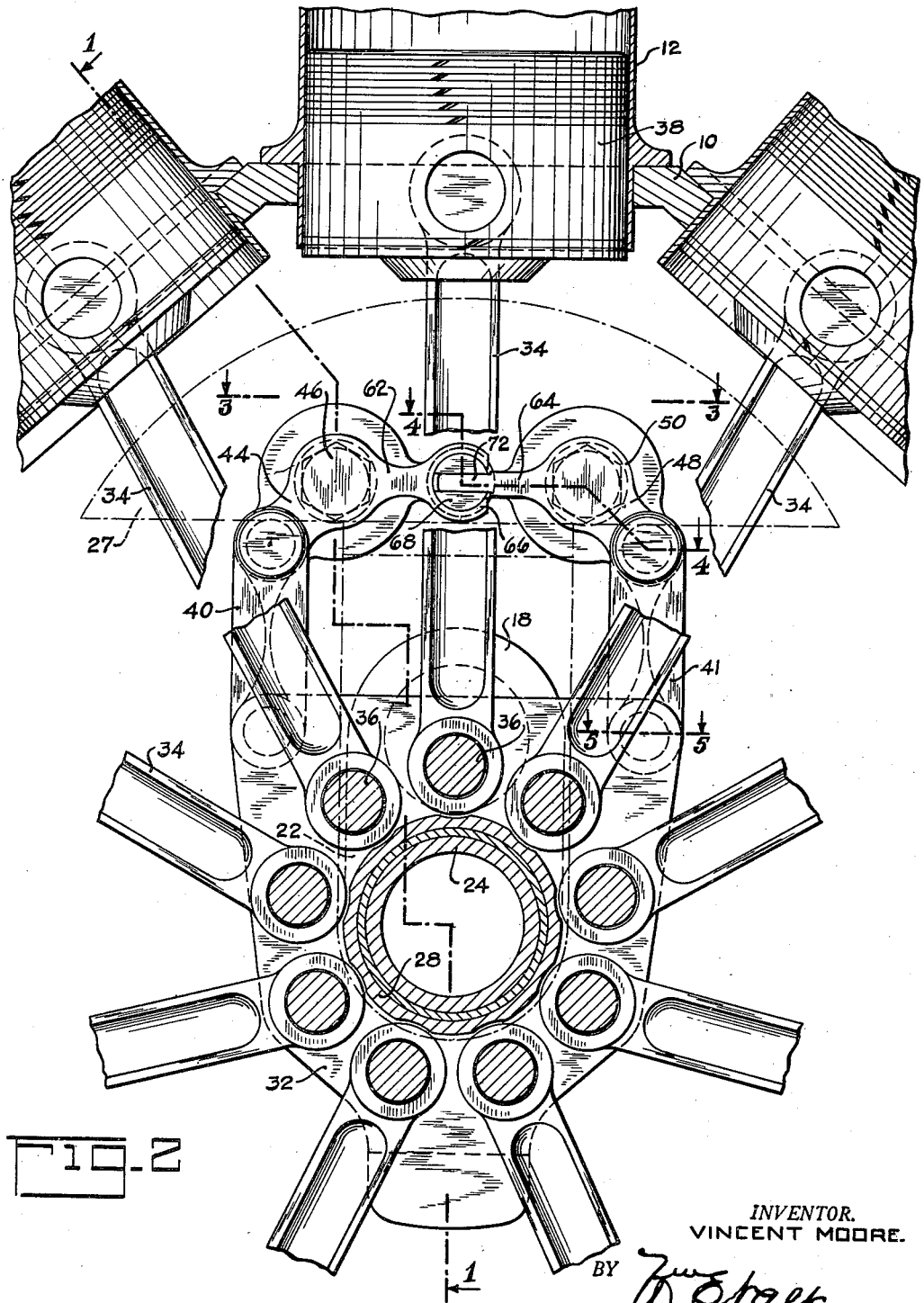

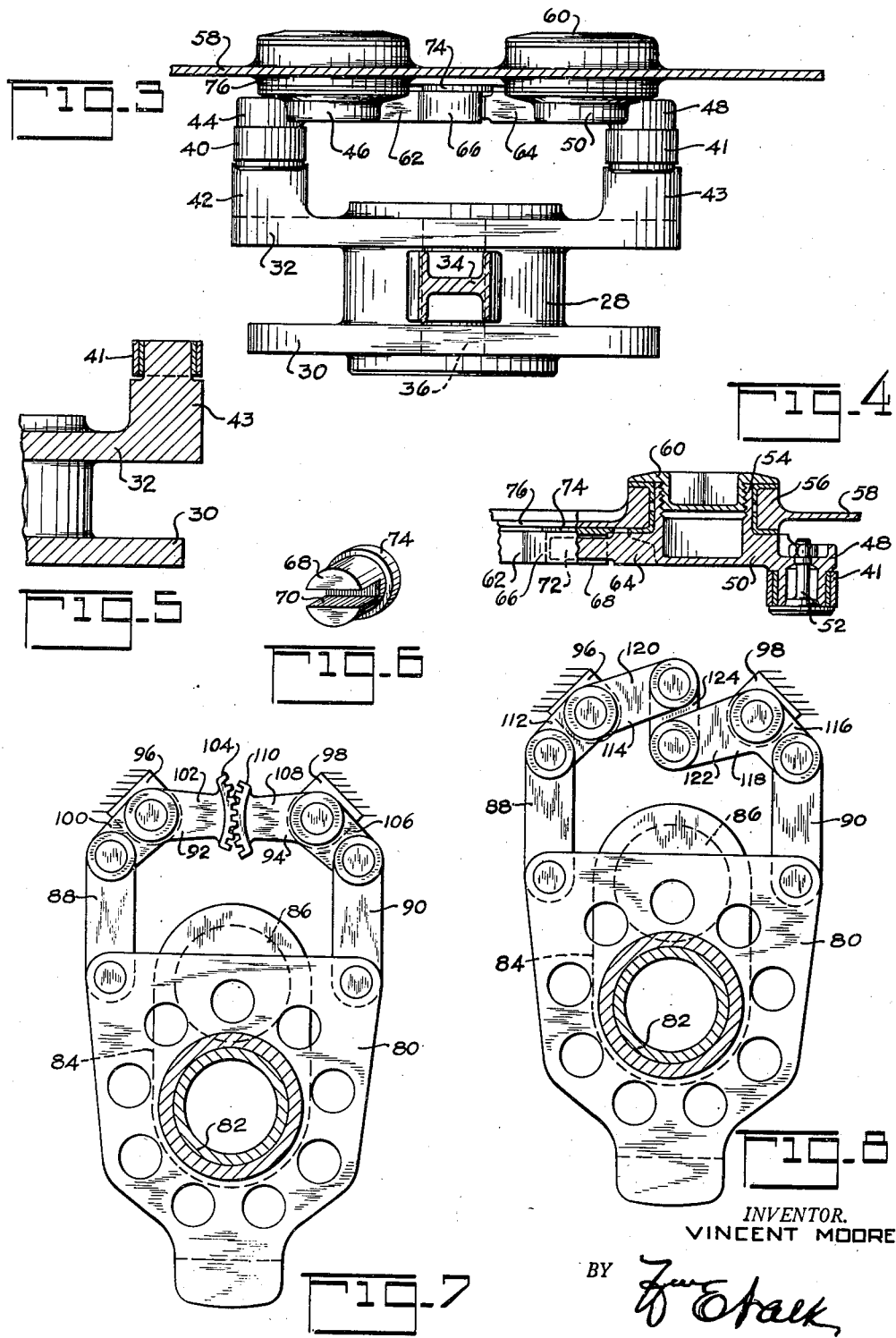

Patented June 8, 1948

2,442,875

UNITED STATES PATENT OFFICE 2,442,875

TRUE-MOTION CONNECTING ROD

Vincent Moore, Glen Rock, N. J., assignor to Wright Aeronautical Corporation, a corporation of New York Application May 19, 1945, Serial No. 594,655

13 Claims. (Cl. 74—580)

This invention relates to a connecting rod system for a radial cylinder engine or pump and is particularly directed to a so-called true motion connecting rod system in which each rod has substantially the same angular motion.

The conventional connecting rod system for a radial cylinder engine comprises a master connecting rod journaled about a crankshaft crankpin together with auxiliary connecting rods journaled about knuckle pins secured to the hub of the master connecting rod. In such a construction, during engine operation the center of the master rod hub moves in a circular path while the various knuckle pins travel in different elliptical-like paths. As a result, the pistons connected to the auxiliary connecting rods have slight errors in displacement thereby introducing valve timing and ignition spark timing difficulties. In addition, the different motions of the master connecting rod and the various auxiliary connecting rods make it difficult to balance the connecting rod system.

It is an object of this invention to provide a simple and efficient connecting rod system in which all the connecting rods have substantially the same motion. Specifically, the invention comprises a hub member journaled about the crankshaft crankpin to which hub member the connecting rods are pivotally connected, together with a pair of auxiliary crank arms disposed parallel to and equal in length to the crankshaft crank arm. The centers of rotation of the auxiliary crank arms are carried by a pair of interconnected levers while the outer ends of said auxiliary crank arms are pivotally connected to said hub member. In this way, the auxiliary crank arms and the crankshaft crank arms comprises a parallel motion mechanism which restrains rotation of the hub member. In addition, since the center of rotation of the auxiliary crank arms are carried by interconnected levers, the mechanism can operate freely even though there are large crankshaft deflections and manufacturing errors in the lengths of the various arms and in the locations of the various pivot points. Also, the auxiliary crank arms merely restrain the hub member against rotation about the crankpin and they do not support the crankshaft in any way.

Other objects of this invention will become apparent upon reading the annexed detailed description in connection with the drawing in which:

Figure 1 is a longitudinal sectional view taken along line 1—1 of Figure 2 of a radial cylinder engine or pump embodying the invention;

Figure 2 is a transverse sectional view taken along line 2—2 of Figure 1;

Figures 2A, 2B and 2C are schematic views similar to Figure 2 illustrating the connecting rod structure in various positions of the crankshaft.

Figure 3 is a sectional view taken along line 3—3 of Figure 2;

Figures 4 and 5 are sectional views taken along lines 4—4 and 5—5 respectively of Figure 2;

Figure 6 is a perspective view of a slotted cylindrical plug forming part of a sliding pivotal connection between a pair of interconnected levers; and Figures 7 and 8 are reduced views of modified forms of the invention.

Referring first to Figures 1 to 6 of the drawing, a radial cylinder engine or pump is illustrated as comprising a crankcase 10 about which a plurality of radially disposed cylinders 12 are mounted having bearings 14 and 16 within which a crankshaft 18 is journaled. A crankshaft 18 has crank arms 20 and 22 with a crankpin 24 connected therebetween. As illustrated, the crank arm 20 provides a conventional split-clamp-type joint with the crankpin 24. In addition, the crankshaft 18 is provided with the usual counterweight balancing means 26.

A hub or annular member 28 journaled about the crankpin 24 comprises a pair of spaced flanges 30 and 32. Connecting rods 34 have their inner ends journaled about knuckle pins 36 which extend between and are carried by said spaced flanges 30 and 32. The outer ends of the connecting rods 34 are pivotally connected to pistons 38 disposed within the cylinders 12.

In order to restrain rotation of the hub member 28 about the crankpin 24, a pair of similar auxiliary crank arms 40 and 41 are pivotally connected to the hub member 28. To this end, the hub member flange 32 is provided with a pair of spaced bosses 42 and 43 about which the outer ends of the auxiliary crank arms 40 and 41 respectively are pivotally connected. The auxiliary crank arm 40 is adapted to rotate about an axis provided by a pivotal connection of its inner end with an arm 44 of a lever 46. Similarly, the other auxiliary crank arm 41 is adapted for rotation about an axis provided by a pivotal connection of its inner end with an arm 48 of a lever 50. Bolts 52 serve to retain the auxiliary crank arms and their associated levers in assembled relation, as best seen in Figure 4. The auxiliary crank arms 40 and 41 are disposed parallel to the crank arms 20 and 22 of the crankshaft. Also, the auxiliary and crankshaft crank arms have the same length, that is the distance between the crankpin and crankshaft axes is the same as the distance between the pivotal axes at the ends of the auxiliary crank arms.

The levers 46 and 50 are both levers of the first class and each are provided with a hub portion 54 journaled within a boss 56 formed on a crankcase bearing diaphragm 58. Each lever hub portion 54 is internally threaded and nut members 60 serve to retain their associated levers in position on the crankcase diaphragm 58. The levers 46 and 50 are also provided with facing arms 62 and 64 respectively. The arm 62 is provided with a boss 66 having a bore for receiving a cylindrical plug 68 longitudinally slotted at 70. The boss 66 is open at the end of its lever 62 to permit a tongue 72 on the arm 64 to be slidably received within the slot 70. The plug 68 is provided with a head portion 74 adapted to be disposed between the arm 62 and the raised portion 76 of the crankcase diaphragm 58, whereby the plug 68 is retained in position in the boss 66 on the arm 62. In this way, the levers 46 and 50 are interconnected in a manner such that any rotative movement of one of said levers enforces opposite rotative movement of the other of said levers. The hub member 28 is also provided with a counterweight portion 78 for balancing the connecting rod system.

With the aforedescribed construction, the two auxiliary crank arms 40 and 41 and the crank arms of the crankshaft constitute parallel cranks providing a parallel motion mechanism such that the auxiliary crank arms through the levers 46 and 50 restrain the hub member 28 against rotative movement about the axis of the crankpin 24. Any tendency of the hub member 28 to rotate about the axis of the crankpin is transmitted by the auxiliary crank arms 40 and 41 to the levers 46 and 50 and is prevented by the sliding pivotal connection between these levers as provided by the cylindrical plug 68 and tongue 72. By mounting the auxiliary crank arms for rotation about centers carried by the interconnected levers 46 and 50, the mechanism operates freely even though there are large crankshaft deflections and/or large manufacturing errors in the length of the crank arms and/or in the location of their pivotal connections. Thus, even if there are such errors or crankshaft deflections, the levers 46 and 50 oscillate slightly as the crankshaft rotates, thereby permitting the auxiliary crank arms 40 and 41 to rotate freely by in effect providing floating centers of rotation for the auxiliary crank arms since their inner ends are pivotally connected to the levers 46 and 50. Accordingly, the fixed pivots for the levers 46 and 50, as provided by their hubs 54, only carry the reaction forces resulting from the turning moment on the hub member 28 about the crankpin 24. Therefore, the hub pivots 54 do not carry any of the crankshaft forces. That is, the forces acting on the crankshaft are not transmitted by the auxiliary crank arms 40 and 41 to the hub pivots 54 but these forces are carried entirely by the crankshaft bearings such as 14 and 16.

During rotation of the crankshaft, the hub member 28 has a motion of translation in which every point rotates in a circle having a radius equal to the radius of a crankpin circle. If there are any large crankshaft deflections and/or manufacturing errors in the lengths of auxiliary crank arms and/or in their pivot locations, the hub member 28 will also oscillate slightly. However, for normal manufacturing tolerances and crankshaft deflections, such oscillations of the hub member 28 will be negligible and, therefore, all the connecting rods 34 will have substantially the same motion. The operation of the auxiliary crank arms 40 and 41 with rotation of the crankshaft 18 is best seen in Figures 2A, 2B and 2C.

In order that the aforedescribed connecting rod system have a high degree of stability in all rotative positions of the crankshaft, levers 46 and 50 preferably should be non-colinear—that is, the arms 44 and 62 of the lever 46 and the arms 48 and 64 of the lever 50 should be inclined relative to each other. In addition, the axes of the pivotal connections of auxiliary crank arms 40 and 41 with the hub member 28 should not be coplanar with the crankpin axis. As illustrated, the levers 46 and 50 each have substantially a 45° bend between their arms 44 and 62 and their arms 48 and 64 respectively. With this arrangement, the longitudinal axes of arms 44 and 48 are substantially at right angles to each other. In addition, a plane containing the crankpin axis and the axis of the pivotal connection of the auxiliary crank arm 40 with the hub member 28 is substantially at right angles to a plane containing the crankpin axis and the axis of the pivotal connection of auxiliary crank arm 41 with the hub member 28. This construction not only provides for good stability of the connecting rod system, but also results in good load distribution by avoiding high stress concentrations. Obviously, however, the invention is not limited to these specific angular relations.

The levers 46 and 50 may be interconnected by means other than the cylindrical plug 68 and tongue 72 illustrated in Figures 1 to 6. Two such modifications are schematically illustrated in Figures 7 and 8.

In Figure 7, the hub member 80, to which the connecting rods (not shown) are to be pivotally connected, is journaled about the crankpin 82 carried by a crank arm 84 on the crankshaft 86. In addition, auxiliary crank arms 88 and 90 are provided having their outer ends pivotally connected to the hub member 80 and having their inner ends pivotally connected to levers 92 and 94 respectively. Levers 92 and 94 are both levers of the first class and are pivotally connected to the fixed crankcase at 96 and 98 respectively. Except for the form of levers 92 and 94, the structure of Figure 7 so far described is similar to that of Figures 1 to 6. Lever 92 is provided with a pair of arms 100 and 102, the arm 100 providing the center of rotation of auxiliary crank arm 88. The other arm 102 of the lever 92 is provided with a gear sector 104 at its outer end. Lever 94 is similar to lever 92 and is provided with an arm 106 to which the inner end of the auxiliary crank arm 90 is pivotally connected and is provided with an arm 108 having a gear sector 110 at its outer end. The gear sectors 104 and 110 are in mesh, whereby these gear sectors enforce opposite rotative movement of the levers 92 and 94.

The operation of Figure 7 obviously is similar to that of Figures 1 to 6. Also, as in Figures 1 to 6, for good stability and load distribution, the arms 100 and 106 are disposed substantially at right angles to each other. In addition, a plane defined by the crankpin axis and the pivotal connection of the auxiliary crank arm 88 with the hub 80 is substantially at right angles to a plane defined by the crankpin axis and the pivotal connection of the auxiliary crank arm 90 with the hub 80.

Figure 8 is a schematic view of a further modification and, except for details of the interconnected levers, the showing of Figure 8 is similar to that of Figure 7. Therefore, in Figures 7 and 8, like parts have been indicated by like reference numerals and a complete description of Figure 8 appears to be unnecessary. In Figure 8, the auxiliary crank arm 88 is pivotally connected to an arm 112 of a lever 114 which is pivotally connected to the fixed crankcase structure 96. Similarly, the inner end of the auxiliary crank arm 90 is pivotally connected to an arm 116 of a lever 118 which is pivotally connected to the fixed crankcase structure 98. Levers 114 and 118 are both of the first class and are provided with arms 120 and 122 which are pivotally interconnected by a smaller link 124. In this way, the link 124 enforces opposite rotation of the levers 114 and 118. The operation of Figure 8 is otherwise similar to the modifications of Figures 1 to 6 and Figure 7. Also, in Figure 8, the arms 112 and 116 preferably are disposed substantially at right angles to each other.

All of the aforedescribed modifications provide a connecting rod system comprising a hub member to which the connecting rods are pivotally connected and in which system the hub member is restrained against rotation by a pair of auxiliary crank arms whose centers of rotation are carried by a pair of interconnected levers which are pivotally supported by a fixed crankcase structure. In this way, the auxiliary crank arms restrain the connecting rod hub member against rotation about its axis and at the same time, the auxiliary crank arms rotate freely even though there are large crankshaft deflections and/or manufacturing errors in the lengths of the auxiliary crank arms and/or in their pivot locations. In addition, in this construction, the auxiliary crank arms do not support the crankshaft in any way so that the pivotal connections to the crankcase of the interconnected levers can be quite light in construction.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, a structure fixed relative to the axis of said crankshaft, and a pair of interconnected levers each pivotally connected to said fixed structure, each of said auxiliary crank arms having its one crank end pivotally connected to said hub member and its other crank end pivotally connected to one of said levers such that each of said auxiliary crank arms is disposed substantially parallel to said crankshaft crank arm.

2. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, and a pair of interconnected levers, each of said auxiliary crank arms having its one crank end pivotally connected to said hub member and its other crank end pivotally connected to one of said levers such that each of said auxiliary crank arms is disposed substantially parallel to said crankshaft crank arm.

3. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, and a pair of interconnected levers, each of said auxiliary crank arms having its one crank end pivotally connected to said hub member and its other crank end pivotally connected to one of said levers such that each of said auxiliary crank arms is disposed substantially parallel to said crankshaft crank arm, each of said levers having a pivot axis fixed relative to the axis of said crankshaft.

4. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, and a pair of interconnected levers, each of said auxiliary crank arms having its one crank end pivotally connected to said hub member and its other crank end pivotally connected to one of said levers such that each of said auxiliary crank arms is disposed substantially parallel to said crankshaft crank arm, each of said levers having a pivot axis fixed relative to the axis of said crankshaft, the pivotal connection of each of said auxiliary crank arms to its associated lever being spaced from the pivot axis of said lever.

5. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, and a pair of levers of the first class each having a pivot axis fixed relative to the axis of said crankshaft and having non-colinear opposed arms extending from its associated pivot axis, one of the arms of one of said levers being connected to one of the arms of the other of said levers in a manner to enforce opposite rotative movement of said levers, each of said auxiliary crank arms having its one crank end pivotally connected to said hub member and its other crank end pivotally connected to one of said levers such that each of said auxiliary crank arms is disposed substantially parallel to said crankshaft crank arm.

6. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, and a pair of levers of the first class each having a pivot axis fixed relative to the axis of said crankshaft and each having a pair of non-colinear arms extending from said fixed axis, one arm of one of said levers being interconnected with one arm of the other of said levers in a manner to enforce opposite rotative movement of said levers, each of said auxiliary crank arms having its one crank end pivotally connected to said hub member and its other crank end pivotally connected to the other arm of one of said levers such that each of said auxiliary crank arms is disposed substantially parallel to said crankshaft crank arm, the arrangement being such that the plane defined by the crankpin axis and the axis of the pivotal connection of one of said auxiliary crank arms with said hub member and the plane defined by the axis of the pivotal connection of said one auxiliary crank arm with its associated lever and the fixed axis of said lever are substantially at right angles to the corresponding planes associated with the other of said auxiliary crank arms.

7. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, a structure fixed relative to the axis of said crankshaft, a pair of levers each pivotally connected to said fixed structure, each of said auxiliary crank arms having its one crank end pivotally connected to said hub member and its other crank end pivotally connected to one of said levers such that each of said auxiliary crank arms is disposed substantially parallel to said crankshaft crank arm, and means providing a sliding pivotal connection between said levers.

8. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, a structure fixed relative to the axis of said crankshaft, a pair of levers each pivotally connected to said fixed structure, each of said auxiliary crank arms having its one crank end pivotally connected to said hub member and its other crank end pivotally connected to one of said levers such that each of said auxiliary crank arms is disposed substantially parallel to said crankshaft crank arm, and link means pivotally interconnecting said levers.

9. A connecting rod assembly for a crankshaft having a crank arm and a crankpin, said assembly comprising a hub member journaled about said crankpin, a plurality of connecting rods pivotally connected to said member, and means for restraining said hub member against rotation about the axis of said crankpin, said means comprising a pair of spaced auxiliary crank arms, each having a crank length substantially equal to that of said crankshaft crank arm, a structure fixed relative to the axis of said crankshaft, a pair of levers each pivotally connected to said fixed structure, each of said auxiliary crank arms having its one crank end pivotally connected to said hub member and its other crank end pivotally connected to one of said levers such that each of said auxiliary crank arms is disposed substantially parallel to said crankshaft crank arm, and gear means interconnecting said levers.

10. A connecting rod assembly for a crankshaft having a crankarm and a crankpin, said assembly comprising a hub member journaled about said crankpin, a plurality of connecting rods pivotally connected to said member, and means for restraining said hub member against rotation about the axis of said crankpin, said means including a pair of auxiliary crankarms, and a pair of levers, each of said levers being pivotally connected to a structure fixed relative to the crankshaft axis, each of said crankarms having one crank end pivotally connected to said hub member and having its other crank end pivotally connected to one of said levers about an axis spaced from the pivot axis of said lever, the arrangement being such that both auxiliary crankarms are equal in length to and are parallel to said crankshaft crankarm.

11. A connecting rod assembly for a crankshaft having a crankarm and a crankpin, said assembly comprising a hub member journaled about said crankpin, a plurality of connecting rods pivotally connected to said member, and means for restraining said hub member against rotation about the axis of said crankpin, said means including a pair of auxiliary crankarms, a pair of levers, each of said levers being pivotally connected to a structure fixed relative to the crankshaft axis, each of said crankarms having one crank end pivotally connected to said hub member and having its other crank end pivotally connected to one of said levers about an axis spaced from the pivot axis of said lever, the arrangement being such that both auxiliary crankarms are equal in length to and are parallel to said crankshaft crankarm, and means interconnecting said levers such that rotative movement of one of said levers enforces simultaneous rotative movement of the other of said levers.

12. A connecting rod assembly for a crankshaft having a crankarm and a crankpin, said assembly comprising a hub member journaled about said crankpin, a plurality of connecting rods pivotally connected to said member, and means for restraining said hub member against rotation about the axis of said crankpin, said means including a pair of auxiliary crankarms, and a pair of levers each pivotally connected to a structure fixed relative to the crankshaft axis, the axes of the pivotal connections of said levers being spaced from each other and the axis of said crankshaft, each of said crankarms being parallel to and substantially equal in length to said crankshaft crankarm and having one crank end pivotally connected to said hub member and having its other crank end pivotally connected to one of said levers about an axis spaced from the pivot axis of said lever, the axes of all of said pivotal connections being parallel to the axis of said crankshaft.

13. A connecting rod assembly for a crankshaft having a crankarm and a crankpin, said assembly comprising a hub member journaled about said crankpin, a plurality of connecting rods pivotally connected to said member, and means for restraining said hub member against rotation about the axis of said crankpin, said means including a pair of auxiliary crankarms, a pair of levers each pivotally connected to a structure fixed relative to the crankshaft axis, the axes of the pivotal connections of said levers being spaced from each other and the axis of said crankshaft, each of said crankarms being parallel to and substantially equal in length to said crankshaft crankarm and having one crank end pivotally connected to said hub member and having its other crank end pivotally connected to one of said levers about an axis spaced from the pivot axis of said lever, the axes of all of said pivotal connections being parallel to the axis of said crankshaft, and means interconnecting said levers such that rotative movement of one of said levers enforces opposite rotative movement of the other of said levers.

VINCENT MOORE.

REFERENCES CITED

The following references are of record in the file of this patent:

UNITED STATES PATENTS

| Number | Name | Date |
|---|---|---|
| 2,122,745 | Kahn | July 5, 1938 |
| 2,166,909 | Kahn | July 18, 1939 |
| 2,235,486 | Lawrance | Mar. 18, 1941 |
| 2,264,484 | Sharpe et al. | Dec. 2, 1941 |